(12) United States Patent
Domanico et al.

(10) Patent No.: US 8,980,107 B2
(45) Date of Patent: Mar. 17, 2015

(54) SPIN FILTER

(75) Inventors: Micheal J. Domanico, Middleton, WI (US); James P. Light, II, Middleton, WI (US); Keith Koptizke, Fallbrook, CA (US); John Zeis, San Maros, CA (US)

(73) Assignee: Exact Sciences Corporation, Madison, WI (US)

( * ) Notice: Subject to any disclaimer, the term of this patent is extended or adjusted under 35 U.S.C. 154(b) by 430 days.

(21) Appl. No.: 13/470,018

(22) Filed: May 11, 2012

(65) Prior Publication Data

US 2012/0285900 A1 Nov. 15, 2012

Related U.S. Application Data

(60) Provisional application No. 61/485,214, filed on May 12, 2011.

(51) Int. Cl.
*B01L 3/00* (2006.01)
*B01D 33/00* (2006.01)

(52) U.S. Cl.
CPC ............... *B01L 3/5021* (2013.01); *B01D 33/00* (2013.01); *B01L 2300/0681* (2013.01)
USPC ....................................................... 210/781

(58) Field of Classification Search
CPC .......... B01L 3/5021; B01L 2300/0681; B01D 33/00
USPC ................... 210/781, 806, 297, 360.1, 380.1; 435/297.3; 422/72
See application file for complete search history.

(56) References Cited

U.S. PATENT DOCUMENTS

| | | | |
|---|---|---|---|
| 4,683,058 | A | 7/1987 | Lyman et al. |
| 5,647,990 | A | 7/1997 | Vassarotti |
| 6,221,655 | B1 | 4/2001 | Fung et al. |
| 6,444,461 | B1 | 9/2002 | Knapp et al. |
| 6,992,182 | B1 | 1/2006 | Muller et al. |
| 7,387,874 | B2 | 6/2008 | Gocke et al. |
| 7,931,920 | B2 | 4/2011 | Hillebrand |
| 8,574,890 | B2 | 11/2013 | Icenhour et al. |
| 2001/0035375 | A1 | 11/2001 | Humicke-Smith |
| 2002/0164631 | A1 | 11/2002 | Shuber et al. |
| 2003/0173284 | A1 | 9/2003 | Baker |
| 2005/0026175 | A1 | 2/2005 | Link et al. |
| 2006/0172302 | A1 | 8/2006 | Hermansen et al. |
| 2006/0172331 | A1 | 8/2006 | Sprenger-Haussels |
| 2008/0299621 | A1 | 12/2008 | Tatnell et al. |
| 2011/0105346 | A1 | 5/2011 | Beattie et al. |

(Continued)

FOREIGN PATENT DOCUMENTS

| | | |
|---|---|---|
| WO | 2004108925 | 12/2004 |
| WO | 2010014970 | 2/2010 |

(Continued)

OTHER PUBLICATIONS

Ahlquist et al., "Colorectal Cancer Screening by Detection of Altered Human DNA in Stool: Feasibility of a Multitarget Assay Panel," Gastroenterology, 2000, 119: 1219-1227.

(Continued)

*Primary Examiner* — David A Reifsnyder
(74) *Attorney, Agent, or Firm* — Casimir Jones S.C.

(57) ABSTRACT

Provided herein is technology relating to filtration and particularly, but not exclusively, to filters and methods for filtering by means of centrifugation.

7 Claims, 5 Drawing Sheets

(56) References Cited

U.S. PATENT DOCUMENTS

2012/0288867 A1 11/2012 Lidgard et al.
2012/0288868 A1 11/2012 Bruinsma et al.
2012/0288957 A1 11/2012 Bruinsma et al.

FOREIGN PATENT DOCUMENTS

WO 2011014970 2/2011
WO 2012002887 1/2012

OTHER PUBLICATIONS

Berthelet et al., "Rapid, direct extraction of DNA from soils for PCR analysis using polyvinylpolypyrrolidone spin columns," FEMS Microbiology Letters, 1996, 138:17-22.
Fotedar et al., "Labratory Diagnostic Techniques for Entamoeba Species," Clinical Microbiology Reviews, 2007, 20 (3):511-532.
Laboratory for Environmental Pathogents Research, Dept of Environmental Sciences, University of Toledo, "Polyvinylpyrrolidone (PVPP) cleanup of DNA samples," Dec. 2004, 2 pages.
Mangiapan et al. "Sequence Capture-PCR Improves Detection of Mycobacterial DNA in Clinical Specimens," Journal of Clinical Microbiology, 1996, 34. p. 1209-1215.
Morgan et al , "Comparison of PCR and microscopy for detection of *Cryptosporidium parvum* in human fecal specimens: Clinical trial.," J. Clin. Microbiol., 1998, 36(4):995.
Parham et al., "Specific Magnetic Bead-Based Capture of Genomic DNA from Clinical Samples: Application to the Detection of Group B Streptococci in Vaginal/Anal Swabs," Clinical Chemistry, 2007, 53:9, p. 1570-1576.
"PVP in Stool Samples," MadSci Network: Molecular Biology, Nov. 20, 2006.
Qiagen, QIAamp DNA Stool Mini Kit Handbook, Aug. 2001, 40 pages.
QIAamp® genomic DNA Kits, product information, Apr. 2008, 12 pages.
SIGMA-ALDRICH Poly(vinylpolypyrrolidone) product information, retrieved Jun. 26, 2013, 2 pages.
St. John et al., "Rapid capture of DNA targets," BioTechniques, 2008, 44:259-264.
Stratagene, Gene Characterization Kits, product information, 1988, 2 pages.
Traverso et al., "Detection of Apc Mutations in Fecal DNA from Patients with Colorectal Tumors," N. Engl. J. Med., 2002, 346(5).
Verweij et al., "Detection and Identification of Entamoeba Species in Stool Samples by a Reverse Line Hybridization Assay," J Clin Microbiol., 2003, 41(11):5041-5045.
Weiner et al., "Kits and their unique role in molecular biology: a brief retrospective," Biotechniques, 2008, 44:701-704.
Whitney et al., "Enhanced Retrieval of DNA from Human Fecal Samples Results in Improved Performance of Colorectal Cancer Screening Test," JMD, 2004, 6(4).

A

B

SPIN FILTER

The present application claims the benefit of U.S. Provisional Patent Application Ser. No. 61/485,214, filed May 12, 2011, which is incorporated herein by reference in its entirety.

FIELD OF INVENTION

Provided herein is technology relating to filtration and particularly, but not exclusively, to filters and methods for filtering by means of centrifugation.

BACKGROUND

Filtration is generally a mechanical or physical operation used to separate a substance (e.g., a particle, a molecule, a precipitate, a solid) from a fluid (i.e., a liquid or a gas) by interposing a medium through which only the fluid can pass. Substances that are larger than a specified filter "cut-off" are retained by the filter and smaller substances pass through the filter with the filtrate.

Fluids flow through a filter due to a difference in pressure—i.e., fluid flows from the high pressure side to the low pressure side of the filter, leaving some material behind on the filter. Gravity provides one way to achieve a pressure difference. In other applications, a pressure filter is used, which requires the application of force to cause liquid to flow through the filter. For example, pressure in the form of compressed air on the feed side (or a vacuum on the filtrate side) may be applied to achieve the filtration. Alternatively, the liquid may flow through the filter by the force exerted by a pump or a piston (e.g., a syringe).

In some applications, a centrifuge is used to apply an inertial force (a "centrifugal force") on the solution or suspension and push it through the filter. Such filters are typically called "spin filters" because they are designed to be spun in the buckets or sample slots of a centrifuge. A conventional spin filter is generally constructed as a tube having an open top end and a filter means on the bottom end opposite the top end. The tubular filter body is made from a non-permeable material (e.g., plastic) that will contain the fluid to be filtered. The typically disc-shaped filter is attached to one end of the tubular filter body and made from a porous or permeable material that is suitable for the filtration task or application. In use, the spin filter is positioned in the centrifuge with the long axis of the tubular body generally aligned along a radius of the centrifuge rotor with the filter end farther away from the point of rotation than the top end. As such, when the rotor is spun, the "centrifugal force" pulls the solution or suspension through the filter and thus achieves the filtration.

The spin filter is generally adapted to fit within the upper portion of a standard centrifuge holder, e.g., a centrifuge tube or a centrifuge cup. The usage of spin filters for separation is largely dictated by the type of filters attached to or laid on top of the bottom end of the spin filter. Examples of filters currently used with commercially available spin filters are ion exchange membranes to separate proteins on the basis of their charges from low molecular weight contaminants (e.g., salts, detergents, etc.); membranes with pore sizes in the micrometer or nanometer ranges for removing particles, concentrating proteins, for buffer exchange, reducing or removing salts or other low molecular weight contaminants. Affinity membranes, on the other hand, are used to capture specific proteins.

This conventional design is adaptable to the volumes and sizes of various types of samples requiring filtration. For example, microcentrifuge spin filters are often used for separations on the scale of approximately a milliliter (see, e.g., U.S. Pat. Nos. 4,683,058 and 6,221,655). Larger spin filters are available for processing samples on the scale of tens to hundreds of milliliters. Different commercial manufacturers have adopted the concept and are selling variations of the spin filters either as a stand-alone unit or as a component of an assay kit.

For many applications, the conventional design is problematic. In particular, the material collected on the filter can accumulate to form a barrier to subsequent fluid flow, thus clogging the filter. The filter at the bottom end of the tubular body is the only permeable exit for the filtrate and consequently, when clogged, the filtration cannot proceed. Remedying the problem to allow the filtration to continue can prolong processing time and result in sample loss. Accordingly, there remains a need for a spin filter that can be used to filter problematic samples without clogging the filter.

SUMMARY

In general, provided herein is technology relating to filtration and particularly, but not exclusively, to filters and methods for filtering by means of centrifugation. Specifically, the technology provided herein addresses the problem of spin filter clogging by providing technology in which both the bottom end and body of the spin filter are made from a porous or permeable material. That is, the walls of the spin filter are made of the same or similar material as that used for the filter means at the bottom end in conventional designs. As such, when the bottom portion becomes clogged during filtration, the walls provide additional surface through which the sample can be filtered.

This technology is provided herein as a spin filter comprising a hollow body, a bottom end, and an open top end opposite the bottom end, wherein the hollow body is made from a porous filtering material. In some embodiments the bottom end is made from a porous filtering material. The hollow body and bottom end of the spin filter assume any shape appropriate for the filtration application to which the filter is applied. For example, in some embodiments the hollow body is a tube and in some embodiments the bottom end is a hemisphere. In other embodiments, the bottom end is a disc, a cone, or a portion of an ellipsoid. Furthermore, the spin filter is made from any material that is appropriate for filtering a sample. Thus, in some embodiments the porous filtering material is polyethylene. Samples comprise varying sizes of particles, matter, precipitates, etc. that are to be removed by filtration. Accordingly, the filtering material can be selected to have physical properties that provide the desired separation. For example, in some embodiments the porous filtering material has a nominal pore size of 20 micrometers. In some embodiments, use of the filter produces a filtrate that a user retains for additional processing. As such, some embodiments provide a spin filter assembly comprising a spin filter as described and a collection vessel adapted to receive the spin filter and collect the filtrate.

Also provided herein are methods for filtering samples comprising placing a sample to be filtered into the spin filter and centrifuging the spin filter. In some embodiments the method comprises recovering the filtrate.

The technology can be provided as a kit for use in a sample separation. Embodiments of such a kit comprise a spin filter as described and an instruction for use. In some embodiments the kit further comprises a collection vessel.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

FIG. 3 is a series of drawings showing embodiments of bottom ends.

FIG. 6A is an assembled view and FIG. 6B is an exploded view.

DETAILED DESCRIPTION

The present technology is a spin filter for filtering samples that clog conventional spin filters. The spin filter provided herein has a similar shape as a conventional spin filter, but the tubular body and bottom are both made of a porous or permeable (or semi-permeable) material. This allows filtration of the sample through the sides of the filter body if the bottom portion becomes clogged with material retained by the filter.
Definitions To facilitate an understanding of the present technology, a number of terms and phrases are defined below. Additional definitions are set forth throughout the detailed description.

As used herein, "a" or "an" or "the" can mean one or more than one. For example, "a" widget can mean one widget or a plurality of widgets.

Figure 1:
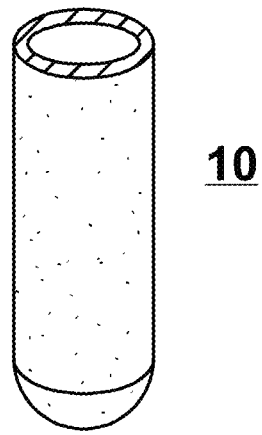
FIG. 1 is a drawing of an embodiment of the spin filter provided herein.
Figure 2:
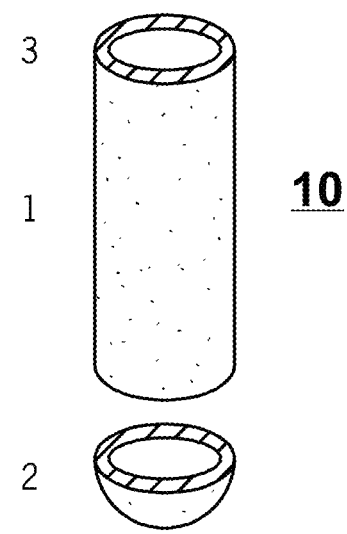
FIG. 2 is a drawing showing an exploded view of the spin filter depicted in FIG. 1.
Figure 3A:
FIG. 3A is a drawing of a disc-shaped, solid (e.g., non-porous or non-permeable) bottom end.
Figure 3B:
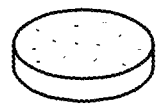
FIG. 3B is a drawing of a disc-shaped, porous (permeable) bottom end.
Figure 3C:
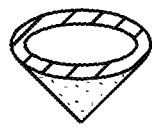
FIG. 3C is a drawing of a porous, conical bottom end.

As used herein, the process of passing a mixture through a filter is called "filtration". The liquid produced after filtering a suspension of a solid in a liquid is called "filtrate", while the solid remaining in the filter is called "retentate", "residue", or "filtrand".
Embodiments of the Technology Although the disclosure herein refers to certain illustrated embodiments, it is to be understood that these embodiments are presented by way of example and not by way of limitation.
Design and Geometry FIGS. 1 and 2 depict an embodiment of a spin filter 10 in an assembled and exploded view, respectively. The spin filter 10 comprises a hollow body 1, a bottom end 2, and an open top end 3 opposite the bottom end 2. The embodiment 10 shown in FIGS. 1 and 2 is a spin filter comprising a tubular (hollow cylindrical) body and a hemi-spherical bottom end. However, the design of the spin filter is not limited to this particular geometry. For example, other shapes and geometries are contemplated such as a spin filter comprising a body shaped as a rectangular prism, or other shape and/or a bottom piece that is shaped as a disc (FIGS. 3A and 3B), cone (FIG. 3C), an ellipse, a portion of an ellipsoid solid, a square, or other shape appropriate for assembly with the body. In some embodiments, the sides and/or the bottom piece may comprise fluted portions or have other architectures that increase surface area. In some embodiments, the bottom end is a disc that is not made from a porous material (e.g., FIG. 3A). In these embodiments the body is made from, or comprises portions made from a porous material and provides the filtration medium. In some embodiments, both the body and the bottom end are made from a porous material and thus both act to filter the sample. The technology is designed to allow the sample to be filtered through multiple portions of the device, such that if a first region of the filter becomes clogged, fluid can pass through and be filtered by a second region of the device. For example, the body walls serve to filter the sample if the bottom end becomes clogged with residue from the sample, e.g., during the filtering process. In preferred embodiments, the pressure driving the filtration also drives the unfiltered sample from a clogged region of the filter an unclogged region of the filter during the filtration process, without the need for redistributing the sample or repositioning the device.

Figure 4:
FIG. 4 is a drawing of an embodiment of the spin filter comprising a body and a bottom end made of a porous material, said filter assembled with a collection tube
Figure 5:
FIG. 5 is a cut-away drawing of the embodiment of the spin filter depicted in FIG. 1.

FIGS. 4 and 5 show the embodiment of the spin filter 10 (as depicted in FIGS. 1 and 2) assembled with a collection vessel adapted to receive the spin filter. This arrangement allows the capture of the filtrate in the collection tube for retention or additional processing.

Figure 6:
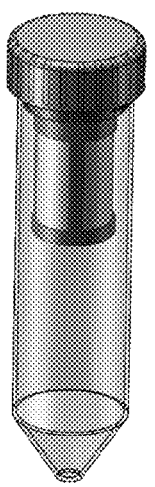
FIG. 6 is a drawing of an embodiment of the spin filter comprising a body of a porous material and a bottom end provided by a filter support.
Figure 6:
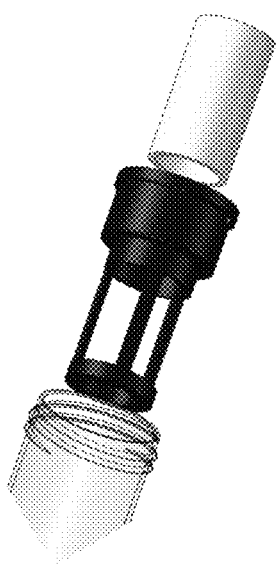

The embodiment shown in FIG. 6 comprises a body 1 and a bottom provided by a filter support made from a non-porous material. The body is inserted into the filter support and a fluid-tight seal is formed between the body and filter support. In this embodiment, only the body (e.g., the walls of the spin filter) provide a porous material through which the sample is filtered.
Materials and Pore Sizes The spin filter is made from a material that provides for filtration of a sample. The material is typically inert with respect to the sample, that is, it does not react with or otherwise contaminate or modify the sample, other than filtering it, in a way that affects a subsequent assay, causes its degradation, caused its decomposition, or the like. In the technology provided herein, the spin filter body, and in some embodiments, the spin filter bottom, is made from polyethylene. The technology is not limited in the types of materials that can be used for the spin filter. For example, many plastics and/or polymers are appropriate such as nylon, cellulose-acetate, polytetrafluoroethylene (PTFE, also known as Teflon), polyvinylidene fluoride (PVDF), polyester, and polyethersulfone. Operating pressure, the chemical and physical characteristics of the composition to be filtered, the size of the entity to remove from the sample, and the mechanical properties of the material (e.g., capability to withstand centrifugation at the speed required for the filtering application) are factors that are considered when selecting an appropriate material from which to make the spin filter.

Filters can be manufactured to have a pore size appropriate for the filtering application. For example, a filter with pore size of 0.2 micrometers will effectively remove most bacteria while smaller pore sizes are required to remove viruses and bacterial spores. For removing larger particulates, a larger pore size is adequate. For example, embodiments of the spin filter provided herein have a 20-micrometer pore size. Other pore sizes that find use in filtration applications are 0.22, 0.45, 10, 20, 30, and 45 micrometers. Larger and smaller pore sizes are contemplated, as well as pore sizes intermediate within the intervals delimited by these values. For some filtration applications the filter is characterized by the molecular weight of the molecules that are retained by the filter. For example, a filter with a 5,000 Da molecular weight cutoff (MWCO) will retain molecules and complexes having at least a molecular weight of approximately 5,000 Da (5 KDa).

Filters can provide MWCOs of 10,000 Da; 30,000 Da; 50,000 Da; 100,000 Da, and other limits required for the filtration task. Operating pressure and the size of the entity to remove from the sample are factors to consider when choosing a pore size or cutoff value.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in pharmacology, biochemistry, medical science, or related fields are intended to be within the scope of the following claims.

We claim:

1. A spin filter comprising
 a) a hollow body (1);
 b) a bottom end (2); and
 c) an opening (3) at a top end of said hollow body (1), opposite the bottom end (2),
 wherein the hollow body (1) and said bottom end (2) are both composed of the same porous filtering material.

2. The spin filter of claim 1 wherein the porous filtering material is polyethylene.

3. The spin filter of claim 1 wherein the porous filtering material has a nominal pore size of 20 micrometers.

4. The spin filter of claim 1 wherein the bottom end (2) has a shape selected from the group consisting of a hemisphere, a disc, a cone, or a portion of an ellipsoid.

5. A spin filter assembly comprising the spin filter of claim 1 and a collection vessel adapted to receive the spin filter.

6. A kit comprising the spin filter of claim 1 and an instruction for use.

7. The kit of claim 6, further comprising a collection vessel adapted to receive the spin filter.

* * * * *